United States Patent [19]

Burton

[11] Patent Number: 5,655,968
[45] Date of Patent: Aug. 12, 1997

[54] DRIVESHAFT WITH SEALED SLIP JOINT SEAL

[76] Inventor: Robert A. Burton, 3426 Bay Highland Dr., Green Bay, Wis. 54311

[21] Appl. No.: 646,202

[22] Filed: May 7, 1996

Related U.S. Application Data

[63] Continuation of Ser. No. 269,385, Jun. 30, 1994, abandoned.

[51] Int. Cl.⁶ .................................................... F16D 3/84
[52] U.S. Cl. .............................. 464/133; 277/24; 464/16
[58] Field of Search .......................... 464/7, 16, 162, 464/163, 157, 172, 183; 277/24, 63, 205

[56] References Cited

U.S. PATENT DOCUMENTS

| | | | |
|---|---|---|---|
| 2,116,290 | 5/1938 | Spicer | 464/172 X |
| 3,123,990 | 3/1964 | Freeman | 464/16 |
| 3,270,418 | 9/1966 | Berg | 277/24 X |
| 3,345,076 | 10/1967 | Wheelock | 277/24 |
| 3,543,536 | 12/1970 | Rekow | 464/16 |
| 3,633,383 | 1/1972 | Kleinschmidt | 464/16 |
| 3,942,336 | 3/1976 | Schultenkämper | 464/16 X |
| 3,980,309 | 9/1976 | Dechavanne | 277/24 |
| 4,308,729 | 1/1982 | Condon | 464/16 |
| 4,592,556 | 6/1986 | Nieman et al. | 464/133 X |
| 5,230,658 | 7/1993 | Burton | 464/16 |

FOREIGN PATENT DOCUMENTS

| | | | |
|---|---|---|---|
| 440518 | 8/1991 | European Pat. Off. | 464/133 |

*Primary Examiner*—Daniel P. Stodola
*Assistant Examiner*—Eileen A. Dunn
*Attorney, Agent, or Firm*—Allen D. Gutchess, Jr.

[57] ABSTRACT

A slip joint for a driveshaft having first and second universal joint yokes includes a first shaft extending rearwardly of the first yoke and rotatable therewith and a second shaft extending rearwardly of the second universal joint yoke and rotatable therewith. The shafts have external and internal splines to enable slidable but nonrotatable movement between the shafts. A sleeve extends rearwardly from the first yoke around the first shaft and a portion of the second shaft. The second shaft has two seals extending therearound and engagable with the interior surface of the sleeve. The first shaft has a bore extending completely therethrough and communicating with passages at both ends of the shaft. A lubricant is applied to the splines prior to assembly and a vent opening is plugged with the yokes in the middle position after assembly. The slip joint is completely maintenance free, never needing lubrication.

19 Claims, 2 Drawing Sheets

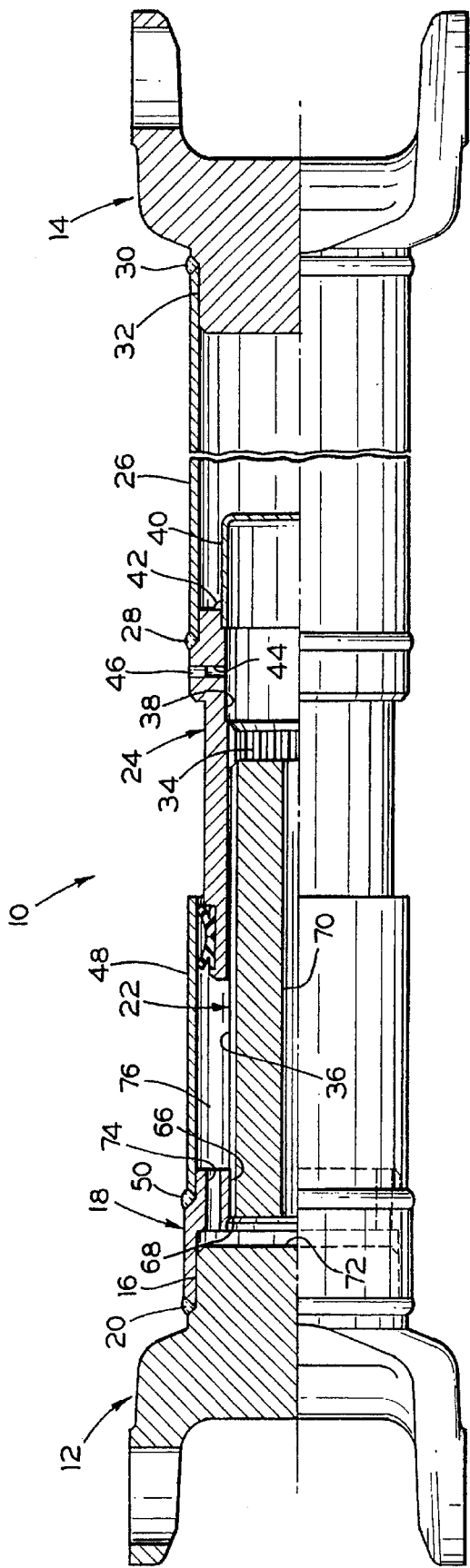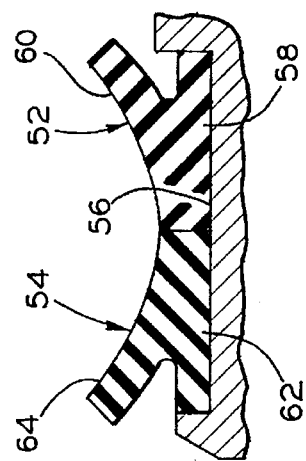
FIG. 1
FIG. 2

5,655,968

DRIVESHAFT WITH SEALED SLIP JOINT SEAL

This is a continuation of application Ser. No. 08/269,385, filed Jun. 30, 1994, now abandoned.

This invention relates to a slip joint grease seal for a driveshaft.

Slip joint seals have been long known in the art. The slip joint comprises male and female splined shafts which connect between two universal joint yokes. They are rotatably connected but can slide relative to one another to accommodate differences in length of the driveshaft during operation. Various seals have been employed to maintain grease between the splined shafts. With one common type of seal heretofore employed, the male splined shaft is exposed to the elements when the universal joints are at extended positions, with contaminants, including water, then being carried back between the two shafts as the driveshaft contracts. Other seals have been overly complex, and inefficient and/or tend to wear out relatively quickly.

The seal in accordance with the invention is used with a slip joint which is between two universal joint yokes in a driveshaft which contracts and extends during operation of a vehicle with which it is used. The male splined shaft extends rearwardly from a first universal joint yoke and rotates therewith. This splined shaft has a central bore extending completely therethrough. A female splined shaft extends rearwardly of a second universal joint yoke, rotates therewith, and is mechanically engaged for slidable but nonrotatable movement with the male splined shaft for all positions of the driveshaft and the yokes. A sealing sleeve extends rearwardly of the first universal joint yoke and rotates therewith, being suitably affixed thereto. The sealing sleeve has an outer diameter exceeding the outer diameter of the female splined shaft which extends into an annular chamber formed between the male splined shaft and the sealing sleeve. The female splined shaft carries an outwardly-facing, annular sealing ring in a groove, at its outer end away from the second universal joint yoke. The sealing ring includes a base band under tension in the groove, with an outwardly-extending lip slanting toward the second universal joint yoke and engagable with the inner surface of the sealing sleeve for all operational positions of the two universal joint yokes. The slanted lip acts as a wiper to remove contaminants, including moisture, from the inner surface of the sealing sleeve when the driveshaft moved toward an extended position.

The female splined shaft also carries a second sealing ring in the annular groove on the side of the first seal toward the first universal joint yoke. It has a base band under tension and an outwardly-extending lip slanting toward the first universal joint yoke and also being engagable with the inner surface of the sealing sleeve for all operational positions of the two universal joint yokes. The second seal retains air and pushes lubricant toward the splines.

A chamber is located beyond the female splined shaft at an end portion toward the second universal joint yoke. A transverse hole communicates with this chamber and is plugged before the slip joint seal is placed in operation, as will be discussed subsequently. Also, passages are provided at the end of the male splined shaft to communicate with the annular space between the, sleeve and the shaft. The length of the sealing sleeve, a propeller shaft, and the male splined shaft can be varied according to the particular requirements.

A retainer cup is affixed to an end of the male splined shaft in one embodiment and to the female splined shaft in another embodiment to close off the corresponding shaft. The cup is sized so that the volumes of air on each side of the connections of the splined shafts are substantially equal when the slip joint is in an intermediate or middle position.

A sticky or viscous lubricant or grease is applied between the splines of the two shafts before assembly. The slip joint is assembled in the middle position and the transverse hole is plugged to trap air. As the yokes move apart and closer together, the air is pushed from one side of the engaged splines to the other through the bore in the male splined shaft with minimal resistance. The slip joint seal is thus permanently sealed and does not require any maintenance during the life of the driveshaft. This seal represents an improvement over the seals disclosed in my U.S. Pat. Nos. 5,230, 658, issued Jul. 27, 1993, and 5,299,982, issued Apr. 5, 1994, which require periodic lubrication.

It is, therefore, a principal object of the invention to provide an improved slip joint for a driveshaft having the objects and advantages discussed above.

Many other objects and advantages of the invention will be apparent from the following detailed description of preferred embodiments thereof, reference being made to the accompanying drawings, in which:

FIG. 1 is a longitudinal view, half in elevation and half in cross section, of a driveshaft employing a slip joint in accordance with the invention;

FIG. 2 is an enlarged view in transverse cross section of sealing rings employed with the slip joint of FIG. 1;

Figure 3:
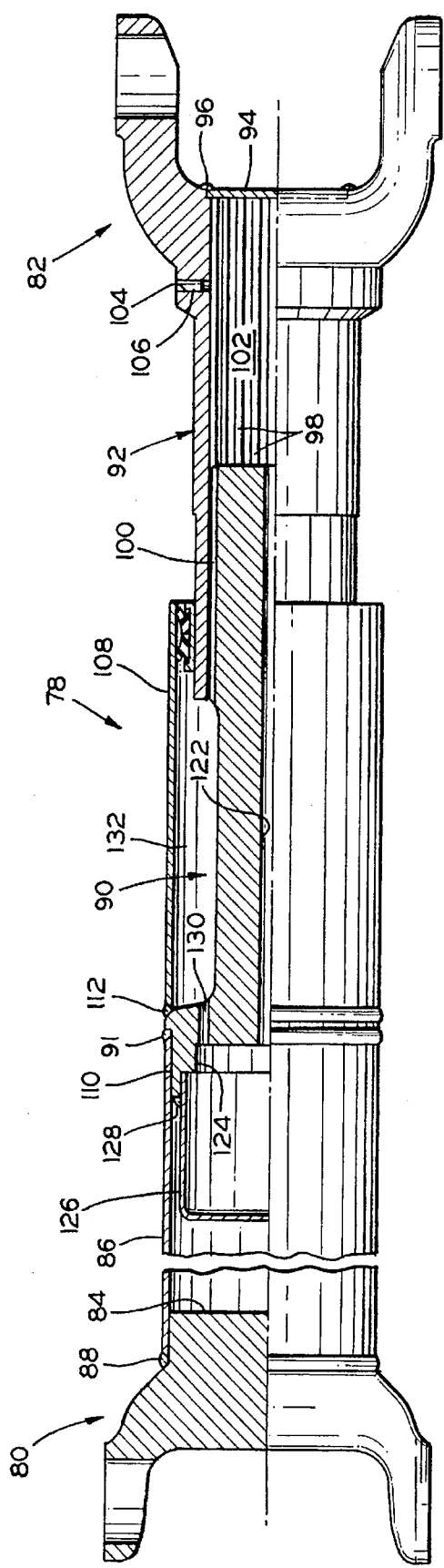
FIG. 3 is a longitudinal view, half in elevation and half in cross section, of a driveshaft employed a modified slip joint in accordance with the invention.
Figure 4:
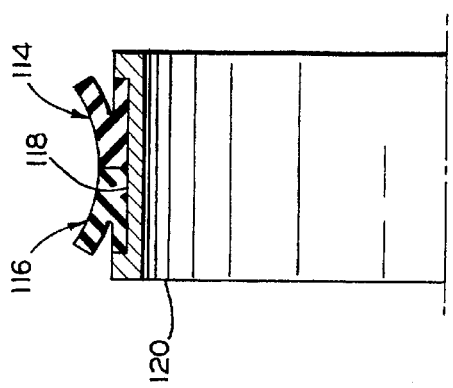
FIG. 4 is an enlarged view in transverse cross section of sealing rings and a mounting ring employed with the slip joint of FIG. 3.

Referring to the drawings, and more particularly to FIG. 1, a driveshaft embodying the invention is indicated at 10 and connects a first universal joint yoke 12 and a second universal joint yoke 14. The yokes can be of various designs to accommodate particular universal joint crosses of particular styles.

The yoke 12 has a hub or butt 16 to which a yoke adaptor 18 is welded at 20. A male splined shaft 22 extends rearwardly toward the second yoke 14 and rotates with the adaptor 18. The splined shaft 22 can be of any suitable length, which can vary considerably from application to application.

A female splined shaft 24 extends rearwardly of the second universal joint yoke 14 and rotates therewith. In this instance, the splined shaft 24 is affixed to the yoke 14 through a propeller shaft or tube 26 to which it is welded at 28. The propeller shaft 26 is also welded at 30 to a hub or butt 32 of the second yoke 14. The length of the propeller shaft 26 can also vary considerably from application to application.

Internal splines 34 of the female splined shaft 24 engage external splines 36 on the male splined shaft 22 for all positions of the first and second universal joint yokes to enable slidable but nonrotatable movement between the shafts.

The female splined shaft 24 has a chamber 38 beyond the internal splines 34 and a retainer cup 40 is located beyond the chamber 38 and is welded at 42 to an end of the female splined shaft 24. A transverse vent hole 44 communicates with the chamber 38 and contains a plug 46 which will be discussed subsequently.

The seal in accordance with the invention includes a sealing sleeve 48 extending rearwardly of the adaptor 18 and is welded thereto at 50. The sealing sleeve 48 has an internal diameter exceeding the outer diameter of the female splined shaft 24 and has a sufficient length such that the splined shaft 22 will not be exposed and the outer end portion of the female splined shaft 24 will always be within the sealing sleeve 48 for all operating positions of the driveshaft.

The seal in accordance with the invention also includes two sealing rings 52 and 54 (FIG. 2) which are carried in back-to-back relationship in a groove 56 in an end portion of the female splined shaft 24. The sealing ring 52 includes an annular base band 58 and a lip 60 which extends outwardly therefrom and slants toward the second universal joint yoke 14. When the driveshaft 10 is moving toward the extended position, the lip 60 is effective to wipe any contaminants off the inner surface of the sealing sleeve 48, which is relatively clean and never exposed directly to the elements.

The second sealing ring 54 also includes a base band 62 and a lip 64 slanting toward the first yoke 12. This seal is effective to push air and lubricant back toward the male splined shaft when the yokes 12 and 14 move toward the retracted position. The sealing rings 52 and 54 are somewhat resilient so that the base bands 58 and 62 can be stretched over the end of the shaft 24 and be resiliently held under tension in the bottom of the groove 56. The resiliency also enables the lips 60 and 64 to maintain uniform contact with the inner surface of the sleeve 48. By way of example, the sealing rings can be made of carboxylated nitrile with a hardness in the order of 85 durometers (Shore A).

The male splined shaft 22 extends into a bore 66 in the adaptor 18 and the adaptor has a shrink fit on the ends of the splines 36. The shaft is then welded to the adaptor 18 by a 360° weld indicated at 68.

The male splined shaft 22 also has a central bore or passage 70 extending completely therethrough. It communicates with the chamber 38 in the female splined shaft 24 and with a transverse passage 72 between the end of the shaft 22 and the hub 16 of the yoke 12. The transverse passage 72, in turn, communicates with two holes or passages 74 in the adaptor 18 which are 180° apart. These in turn communicate with an annular space 76 between the sleeve 48 and the shaft 22.

When the yokes move toward a retracted position, air moves from the space 76 through the passages 74, 72, and 70 toward the chamber 38 and the cup 40. Oppositely, when the yokes 12 and 14 move toward an extended position, air moves from the cup 40, the chamber 38, and the passage 70 in the shaft 22, into the passages 72 and 74, and into the space 76.

Prior to assembly of the slip joint, a thick, viscous lubricant or grease is applied to the male and female splines. After assembly, the slip joint seal and the overall driveshaft is placed in the middle position so that air volume at both ends of the splines is substantially equal. The plug 46 is then placed in the transverse hole 44 to permanently seal the slip joint. This seal does not require any maintenance during the life of the driveshaft and greatly reduces operating costs.

Referring to FIG. 3, a modified driveshaft embodying the invention is indicated at 78. This driveshaft and seal function similarly to that of FIG. 1 except that they are designed to accommodate commercially-available first and second yokes 80 and 82 with minimal modifications. The yoke 80 has a hub or butt 84 to which a propeller shaft or tube 86 is welded at 88. A male splined shaft 90 extends rearwardly from the propeller shaft 86 and is welded thereto at 91. The propeller shaft can be of any suitable length, which can vary considerably from application to application.

A female splined shaft 92 extends rearwardly of the second universal joint yoke 82 and is structurally integral therewith. The opening of the female splined shaft at the yoke 82 is sealed by a plate 94 which is affixed to the yoke by a 360° weld 96.

Internal splines 98 of the female splined shaft 92 engage external splines 100 on the male splined shaft 90 for all positions of the first and second universal joint yokes to enable slidable but nonrotatable movement between the shafts.

The female splined shaft 92 has a chamber 102 beyond the end of the male splined shaft 90. A transverse vent hole 104 communicates with the chamber 102 and contains a plug 106 which will be discussed subsequently.

The seal of FIG. 3 includes a sealing sleeve 108 extending rearwardly of the yoke 80 and is affixed to a large diameter hub 110 of the male splined shaft 90 by a weld 112. The sealing sleeve 108 has an internal diameter exceeding the outer diameter of the female splined shaft 92 and has a sufficient length such that the splined shaft 90 will not be exposed and the outer end portion of the female splined shaft 92 will always be within the sealing sleeve 108 for all operating positions of the driveshaft.

The seal of FIG. 3 also includes two sealing rings 114 and 116 which are carried in back-to-back relationship in a groove 118 of a band 120, in this instance. The band 120 can be affixed to an outer end of the female splined shaft 92 by a shrink fit, for example. The sealing rings 114 and 116 function in the same manner as the sealing rings 52 and 54 and will not be discussed in further detail. These rings can also be made of the same material.

The male splined shaft 90 also has a central bore or passage 122 extending completely therethrough. It communicates with the chamber 102 and with a chamber 124 in the hub 110 of the splined shaft 90. The end of the chamber 124 is closed off by a retainer cup 126 welded to the hub 110 by a weld 128. Passages or bores 130 in the hub 110 connect the chamber 124 with a space 132 between the sleeve 108 and the shaft 90. Both of the cups 40 and 126 can be sized so that equal volumes of air are located on both sides of the engaged splines when the driveshaft and seal are in the middle position.

When the yokes 80 and 82 retract toward one another, air moves from the space 132 through the passages 130 and the chamber 124, through the bore 122 and toward the chamber 102. Oppositely, when the yokes 80 and 82 move toward an extended position, air moves from the cup 126 through the passage 122 and into the space 132.

Like the driveshaft 10, prior to the assembly of the driveshaft 78, a thick, viscous lubricant or grease is applied to the male and the female splines. After assembly, the slip joint seal and the overall driveshaft are placed in the middle position so that air volume at both ends of the splines is substantially equal. The plug 106 is then placed in the transverse hole 104 to permanently seal the slip joint. No maintenance is required during the life of the driveshaft.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A driveshaft comprising a first universal joint yoke, a second universal joint yoke spaced a varying distance from said first universal joint yoke when said driveshaft is in operation, a first shaft extending rearwardly of said first universal joint yoke and rotatable therewith, a second shaft extending rearwardly of said second universal joint yoke and rotatable therewith, said first shaft having external splines and said second shaft having internal splines which are in mechanical engagement with one another for all operating positions of said first and said second universal joint yokes to enable slidable but nonrotatable movement between said first and second shafts, said second shaft having first and second seals extending therearound at an outer end portion thereof toward said first universal joint yoke, said first and second seals having base bands engaging the outer end portion of said second shaft, said first and second seals having annular lips extending outwardly from said base bands in opposite directions, a sleeve extending rearwardly of said first universal joint yoke, having an open end, and extending over at least a substantial portion of said first shaft, said sleeve having a diameter greater than the outer diameter of said second shaft, said first and second seals being in contact with an inner surface of said sleeve for all operating positions of said first and said second universal joint yokes for sealing off outside air, a bore in said first shaft extending completely therethrough, connecting passage means connecting said bore and space between said sleeve and said first shaft to enable the passage of air between said bore and the space between said sleeve and said first shaft when said first and said second shafts move toward and away from one another during operation of the driveshaft, first closing off means closing off said first shaft from outside air beyond said connecting passage means, and second closing off means closing off said second shaft from outside air at the end toward said second yoke, one of said first closing off means and said second closing off means being of a size such that volumes of air beyond engaged portions of said external and internal splines, when said first and said second shafts are in a middle position between maximum retracted and extended positions during operation of the driveshaft, are substantially equal, whereby air need not be vented and added beyond the engaged portions of said external and internal splines when said first and second universal joint yokes are moved toward and away from one another during operation of said driveshaft.

2. A driveshaft according to claim 1 wherein said annular lip of said first seal extends toward the open end of said sleeve to wipe contaminants off the inner surface of said sleeve, and said annular lip of said second seal extends in the opposite direction to prevent passage of lubricant thereby and to direct lubricant toward said first shaft.

3. A driveshaft according to claim 1 wherein one of said first and second closing off means comprises a retaining cup.

4. A driveshaft according to claim 1 wherein said second closing off means closing off said second shaft is a retaining cup affixed to an end of said second shaft toward said second universal joint yoke.

5. A driveshaft according to claim 1 wherein said first closing off means closing off said first shaft beyond said connecting passage means is a retaining cup affixed to an end of said first shaft toward said first universal joint yoke.

6. A driveshaft according to claim 1 wherein said second shaft is connected to said second universal joint yoke by a propeller shaft.

7. A driveshaft according to claim 1 wherein said first shaft is connected to said first universal joint yoke by a propeller shaft.

8. A driveshaft according to claim 1 wherein said second shaft is structurally integral with said second universal joint yoke.

9. A driveshaft according to claim 1 wherein said first and second seals are located in a band which is affixed to said second shaft.

10. A driveshaft comprising a first universal joint yoke, a second universal joint yoke spaced a varying distance from said first universal joint yoke when said driveshaft is in operation, a first shaft extending rearwardly of said first universal joint yoke and rotatable therewith, a second shaft extending rearwardly of said second universal joint yoke and rotatable therewith, said first shaft having external splines and said second shaft having internal splines which are in mechanical engagement with one another for all operating positions of said first and second universal joint yokes to enable slidable but nonrotatable movement between said first and said second shafts, said second shaft having sealing means extending therearound at an outer end portion thereof toward said first universal joint yoke, said sealing means having annular lip means extending outwardly from said second shaft around the outer end portion thereof, a sleeve extending rearwardly of said first universal joint yoke, having an open end facing said second universal joint yoke, and extending over at least a substantial portion of said first shaft, said sleeve having a diameter greater than the outer diameter of said second shaft and extending around an end portion of said second shaft, said annular lip means of said sealing means being in contact with the inner surface of said sleeve for all operating positions of said first and said second universal joint yokes for sealing off outside air, a bore in said first shaft extending completely therethrough, connecting passage means connecting said bore and space between said sleeve and said first shaft to enable the passage of air between said bore and the space between said sleeve and said first shaft when said first and said second shafts move toward and away from one another during operation of the driveshaft, first closing off means closing off said first shaft beyond said connecting passage means from outside air, and second closing off means closing off said second shaft at the end toward said second universal joint yoke from outside air during all stages of operation, one of said first closing off means and said second closing off means being of a size such that volumes of air beyond engaged portions of said external and internal splines, when said first and second shafts are in a middle position between maximum retracted and extended positions during operation of the driveshaft, are substantially equal, whereby air need not be vented and added beyond the engaged portions of said external and internal splines when said first and second universal joint yokes are moved toward and away from one another during operation of said driveshaft.

11. A driveshaft according to claim 10 wherein said annular lip means of said sealing means comprises two seals extending around the outer end portion of said second shaft, said two seals having base bands, said two seals having annular lips extending outwardly from said base bands in opposite directions.

12. A driveshaft according to claim 11 wherein one of said annular lips extends toward the open end of said sleeve to wipe contaminants off the inner surface of said sleeve, and the other of said annular lips extends in the opposite direction to prevent passage of lubricant thereby and to direct lubricant toward said first shaft.

13. A driveshaft according to claim 11 wherein said two seals are located in a band which is affixed to said second shaft.

14. A driveshaft according to claim 10 wherein said second closing off means closing off said second shaft is a retaining cup affixed to an end of said second shaft toward said second universal joint yoke.

15. A driveshaft according to claim 10 wherein said first closing off means closing off said first shaft beyond said connecting passage means is a retaining cup affixed to an end of said first shaft toward said first universal joint yoke.

16. A driveshaft according to claim 10 wherein said second shaft is connected to said second universal joint yoke by a propeller shaft.

17. A driveshaft according to claim 10 wherein said first shaft is connected to said first universal joint yoke by a propeller shaft.

18. A driveshaft according to claim 10 wherein said second shaft is structurally integral with said second universal joint yoke.

19. A driveshaft according to claim 10 wherein one of said first and second closing off means comprises a retaining cup.

* * * * *

UNITED STATES PATENT AND TRADEMARK OFFICE
CERTIFICATE OF CORRECTION

PATENT NO. : 5,655,968
DATED : August 12, 1997
INVENTOR(S) : Robert A. Burton

It is certified that error appears in the above-identified patent and that said Letters Patent is hereby corrected as shown below:

Column 1, line 62, delete "," before "sleeve".

Column 3, line 10, change "S8" to --58--.

Signed and Sealed this

Twenty-fifth Day of November, 1997

Attest:

BRUCE LEHMAN

Attesting Officer

Commissioner of Patents and Trademarks